(12) United States Patent
Chang et al.

(10) Patent No.: US 11,061,305 B2
(45) Date of Patent: Jul. 13, 2021

(54) LIGHT PATH ADJUSTMENT MECHANISM

(71) Applicant: YOUNG OPTICS INC., Hsinchu (TW)

(72) Inventors: Yu-Chen Chang, Hsinchu (TW);
Han-Min Chiu, Zhubei (TW); Wei-Szu Lin, Hsinchu (TW); Sheng-Ya Hsu, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 197 days.

(21) Appl. No.: 16/225,978

(22) Filed: Dec. 19, 2018

(65) Prior Publication Data

US 2019/0196308 A1 Jun. 27, 2019

(30) Foreign Application Priority Data

Dec. 25, 2017 (TW) ................ 106145540

(51) Int. Cl.

| G02B 26/08 | (2006.01) |
|---|---|
| G02B 7/02 | (2021.01) |
| G03B 21/14 | (2006.01) |
| G02B 26/10 | (2006.01) |
| G03B 21/20 | (2006.01) |
| G02B 21/06 | (2006.01) |
| G02B 27/14 | (2006.01) |

(52) U.S. Cl.
CPC ........... *G03B 21/142* (2013.01); *G02B 7/023* (2013.01); *G02B 26/085* (2013.01); *G02B 26/0875* (2013.01); *G02B 26/103* (2013.01); *G02B 21/06* (2013.01); *G02B 26/101* (2013.01); *G02B 27/149* (2013.01); *G03B 21/2033* (2013.01); *G03B 2205/0069* (2013.01)

(58) Field of Classification Search
CPC .. G03B 21/142; G02B 7/023; G02B 26/0875; G02B 26/103
USPC ......................................... 353/101
See application file for complete search history.

(56) References Cited

U.S. PATENT DOCUMENTS

| 6,295,154 B1* | 9/2001 | Laor | G02B 6/3512 |
|---|---|---|---|
| | | | 359/223.1 |
| 9,213,223 B2 | 12/2015 | Mashitani | |
| 2006/0119961 A1* | 6/2006 | Heaton | G02B 26/085 |
| | | | 359/872 |
| 2008/0226312 A1* | 9/2008 | Mizoguchi | G02B 26/085 |
| | | | 399/38 |
| 2016/0370575 A1* | 12/2016 | Lin | G02B 26/085 |
| 2016/0377962 A1 | 12/2016 | Mizoguchi | |

FOREIGN PATENT DOCUMENTS

| TW | I289722 B | 11/2007 |
|---|---|---|
| TW | 200900835 A | 1/2009 |

* cited by examiner

*Primary Examiner* — Jerry L Brooks
(74) *Attorney, Agent, or Firm* — Muncy, Geissler, Olds & Lowe, P.C.

(57) ABSTRACT

A light path adjustment mechanism includes a support, a carrier, an optical plate member and a raised structure. The carrier is disposed in the support and connected to the support by a first connection bar and a second connection bar. The optical plate member is disposed on the carrier, and the raised structure is provided on a periphery of the carrier and integrally formed as one piece with the carrier.

19 Claims, 11 Drawing Sheets

LIGHT PATH ADJUSTMENT MECHANISM

BACKGROUND OF THE INVENTION a. Field of the Invention

The invention relates generally to an optical mechanism, and more particularly to a light path adjustment mechanism.

b. Description of the Related Art

Nowadays, various image display technologies are widely used in daily life. In order to increase the resolution and picture quality of an image display device, a light path adjustment mechanism can be used to adjust propagation paths of light in the image display device to shift pixel images and thereby increase addressability. However, the number of components, weight and occupied space of a conventional light path adjustment mechanism is considerably large, and thus the entire mechanism is difficult to be miniaturized. Therefore, it is desirable to provide a simple, reliable, light and compact design of a light path adjustment mechanism.

BRIEF SUMMARY OF THE INVENTION

According to one aspect of the present disclosure, a light path adjustment mechanism includes a first pair of elastic members, a second pair of elastic members, an outer frame, an inner frame, an optical plate member and a raised structure. An inner side of the outer frame is connected with the first pair of elastic members, an outer side of the outer frame is connected with the second pair of elastic members, and the outer frame, the first pair of elastic members and the second pair of elastic members are integrally formed as one piece. The inner frame is disposed inside the outer frame and connected with the outer frame by the first pair of elastic members. The optical plate member is disposed on the inner frame, and a raised structure is integrally formed on at least two opposite sides of the outer frame.

According to the above aspect, at least part of the actuators can be disposed overlapping the carrier to reduce occupied space, weight and component number, thereby realizing a slim and compact light path adjustment mechanism that can be advantageously installed in various microelectronic devices. Further, the raised structure disposed on the carrier may reinforce structural strength of the carrier to reduce deformation degree and axial torque applied thereon. Besides, the natural frequency of the carrier may be controlled by adjusting the arrangement of the raised structure to avoid resonance vibrations.

According to another aspect of the present disclosure, a light path adjustment mechanism includes a support, a carrier, an optical plate member and a raised structure. The carrier is disposed in the support and connected to the support by a first connection bar and a second connection bar. The optical plate member is disposed on the carrier, and the raised structure is provided on a periphery of the carrier and integrally formed as one piece with the carrier.

According to the above aspect, the raised structure may be integrally formed as one piece with the carrier using the same material to simply fabrication processes and costs. Further, at least part of the actuators can be disposed overlapping the carrier to reduce occupied space, weight and component number, and the raised structure disposed on the carrier may reinforce structural strength of the carrier to reduce deformation degree and axial torque applied thereon.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The following description relates in general to a light path adjustment mechanism used with an optical system (e.g., a display device or a projector) to modify or change light paths to enhance image resolution, improve picture quality (e.g., eliminating dark regions or blurring image edges), or provide other beneficial effects. Further, it should be understood that the light path adjustment mechanism is not limited to a specific arrangement and location in the optical system.

Figure 1:
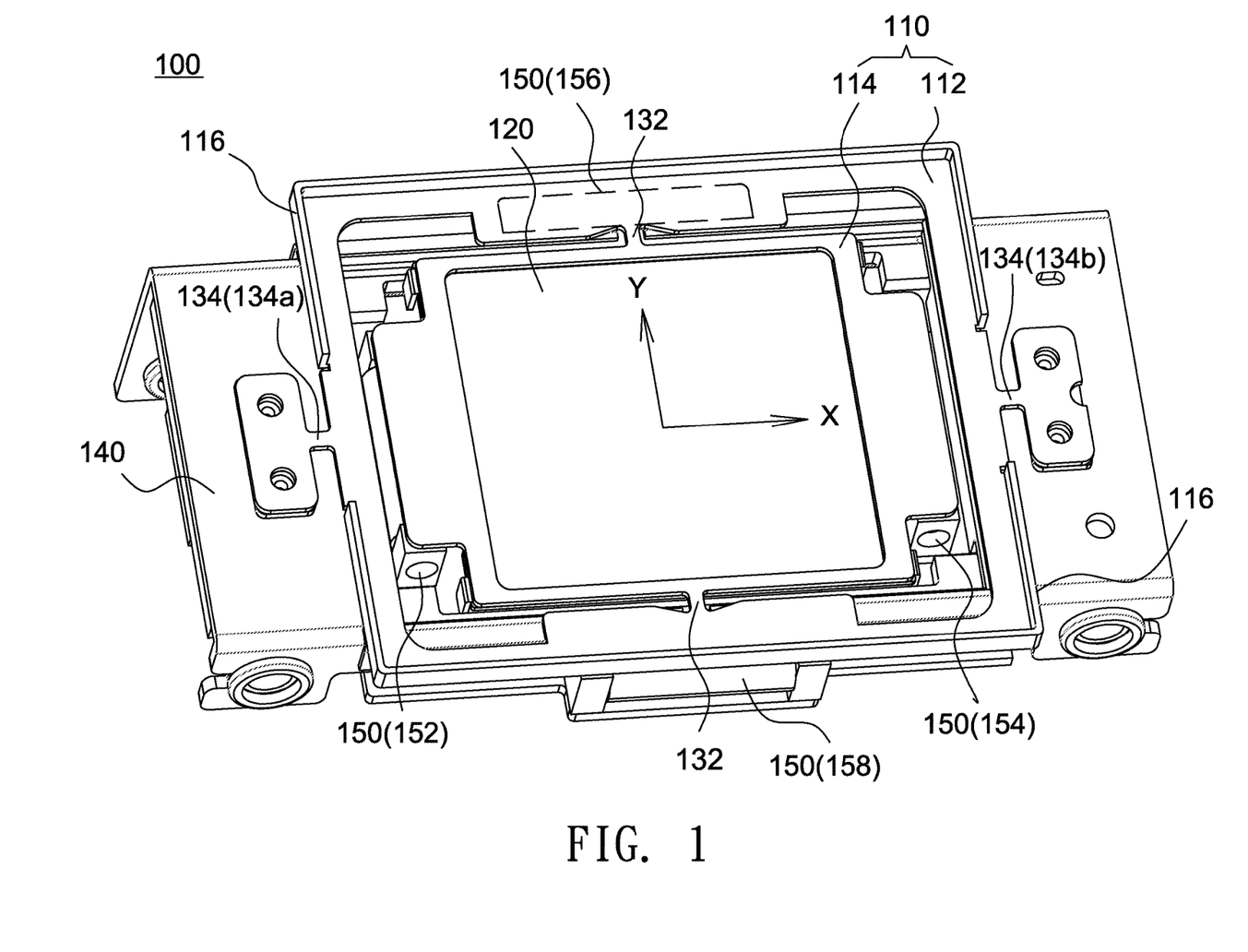
FIG. 1 shows a schematic diagram of a light path adjustment mechanism according to an embodiment of the invention.

FIG. 1 shows a schematic diagram of a light path adjustment mechanism according to an embodiment of the invention. With reference to FIG. 1, a light path adjustment mechanism 100 includes a carrier 110, an optical plate member 120, a first pair of elastic members 132, a second pair of elastic members 134 and a support 140. The carrier 110 may include an outer frame 112 and an inner frame 114. The inner frame 114 and the outer frame 112 may be located at the same height or may lie in the same plane, and the inner frame 114 is disposed inside the outer frame 112 and connected with the outer frame 112 by the first pair of elastic members 132, and the outer frame 112 is connected with the support 140 by the second pair of elastic members 134.

More specifically, an inner side of the outer frame 112 is connected with the first pair of elastic members 132, and an outer side of the outer frame 112 is connected with the second pair of elastic members 134. Further, Since the outer frame 112 of the carrier 110 is connected with the support 140 by the second pair of elastic members 134, the two elastic members of the second pair of elastic members 134 are a first connection bar 134a and a second connection bar 134b for connecting the carrier 110 to the support 140.

The optical plate member 120 may be disposed on the inner frame 114 of the carrier 110. The optical plate member 120 is not limited to a specific form or structure, so long as it may change, at least to some extent, the traveling direction of incoming light beams. For example, the optical plate member 120 may be, but is not limited to, a lens or a mirror. Two ends of the second pair of elastic members 134 are respectively connected with or attached to the support 140 through fasteners such as screws or pins. The carrier 110 may be provided with a reinforcement structure to, for example, increase its structural strength. In this embodiment, the reinforcement structure may be a raised structure 116 that is provided on a periphery of the carrier 110 and integrally formed as one piece with the carrier 110. For example, the raised structure 116 may bend or protrude upwardly on opposite sides of the outer frame 112. Note the reinforcement structure is not limited to the raised structure and may have any desired shape and form. In one embodiment, the raised structure 116 may increase structural strength of the carrier 110 to reduce deformation degree and axial torque applied thereon. Besides, the natural frequency of the carrier 110 may be controlled by adjusting the arrangement of the raised structure 116 to avoid resonance vibrations. Further, the raised structure 116 may have any desired shape or design without limitation. For example, the raised structure 116 may include, but is not limited to, at least one of a bump, a flange, a corner, a step, a wall, etc. In one embodiment, the raised structure 116 may be symmetrically disposed on two opposite sides of the carrier 110 to balance the weight of the carrier 110 or the load applied on the carrier 110, but the invention is not limited thereto.

FIGS. 9A-9J show schematic diagrams illustrating various structures of a carrier according to different embodiments of the invention. The following Table 1 shows simulation results of a twist angle caused on and an axial torque applied to an elastic member (a connection bar) according to various embodiments, where the items labeled as numbers 1-10 respectively corresponding to the samples shown in FIGS. 9A-9J. Note the twist angle shown in Table 1 is the required rotation angle of the elastic member (connection bar) to cause the optical plate member to rotate through an angle of 0.1125 degree. For purposes of comparison, a conventional carrier with a configuration similar to the samples listed in Table 1 but without the raised structure may, for example, have a twist angle of 0.195 degree and an axial torque of 4.478 N-mm. Compared with the conventional carrier, different arrangements of the raised structure shown in FIGS. 9A-9J may reduce the twist angle and axial torque, which indicates the provision of a raised structure may increase rigidity to decrease deformation degree of an actuated carrier and thus increase operating life of components.

TABLE 1

| No. | 1 | 2 | 3 | 4 | 5 |
| --- | --- | --- | --- | --- | --- |
| twist angle (degree) | 0.1813 | 0.1554 | 0.1418 | 0.1657 | 0.1544 |
| X-axis axial-torque (N-mm) | 4.428 | 4.384 | 4.363 | 4.358 | 4.390 |
| Sample description | 0.5 mm bump and outer frame with cutouts | 0.5 mm upright folds on two edges | 1.5 mm upright folds on four edges | 0.5 mm bump and outer frame without cutouts | 0.5 mm bump and 1.5 mm folds on four edges |

| No. | 6 | 7 | 8 | 9 | 10 |
| --- | --- | --- | --- | --- | --- |
| twist angle (degree) | 0.1668 | 0.1521 | 0.1398 | 0.1465 | 0.1413 |
| X-axis axial-torque (N-mm) | 4.361 | 4.378 | 4.349 | 4.394 | 4.363 |
| Sample description | outer frame without cutouts | 1.0 mm upright folds on four edges | 1.5 mm upright folds on four edges | 1.5 mm upright folds on four edges | 1.5 mm upright folds on four edges |

In one embodiment, the carrier 110, the first pair of elastic members 132 and the second pair of elastic members 134 are integrally formed at least in part to reduce the component number, structure complexity and assembly time. In one embodiment, the outer frame 112, the inner frame 114, the first pair of elastic members 132 and the second pair of elastic members 134 may be all integrally formed as one piece using the same material (such as magnetic substance). Alternatively, two or three of them may be integrally formed as one piece and are then combined with the remainder. For example, the outer frame 112 and the raised structure 116 may be integrally formed as one piece with the first pair of elastic members 132 and the second pair of elastic members 134 using the same material (such as magnetic substance), or the outer frame 112 and the raised structure 116 may be integrally formed as one piece with the first pair of elastic members 132 using the same material (such as magnetic substance).

Figure 2A:
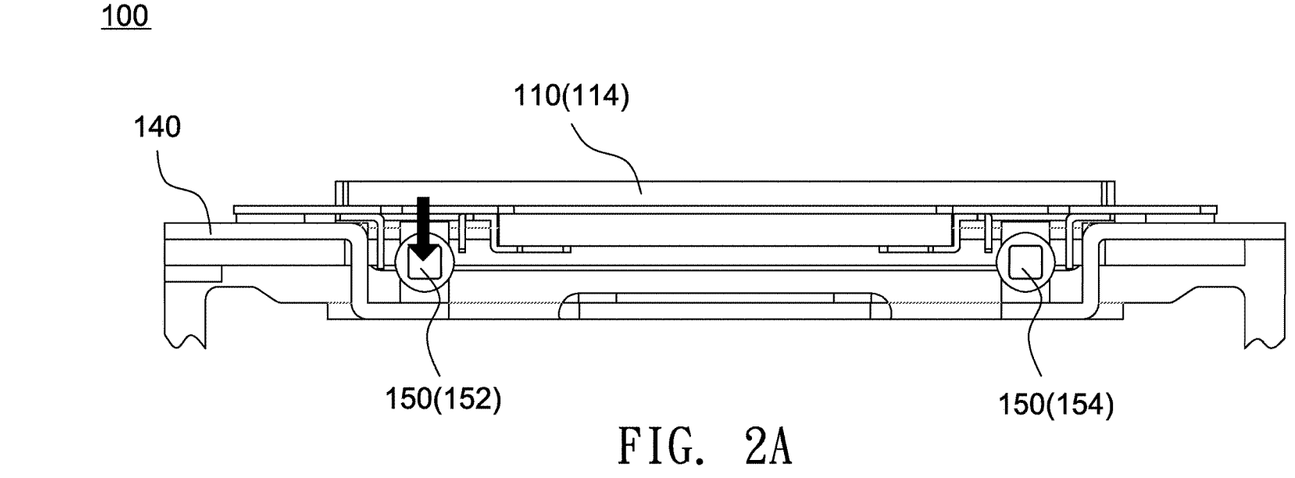
FIGS. 2A and 2B show schematic diagrams illustrating magnetic interaction of each actuator according to an embodiment of the invention.
Figure 2B:
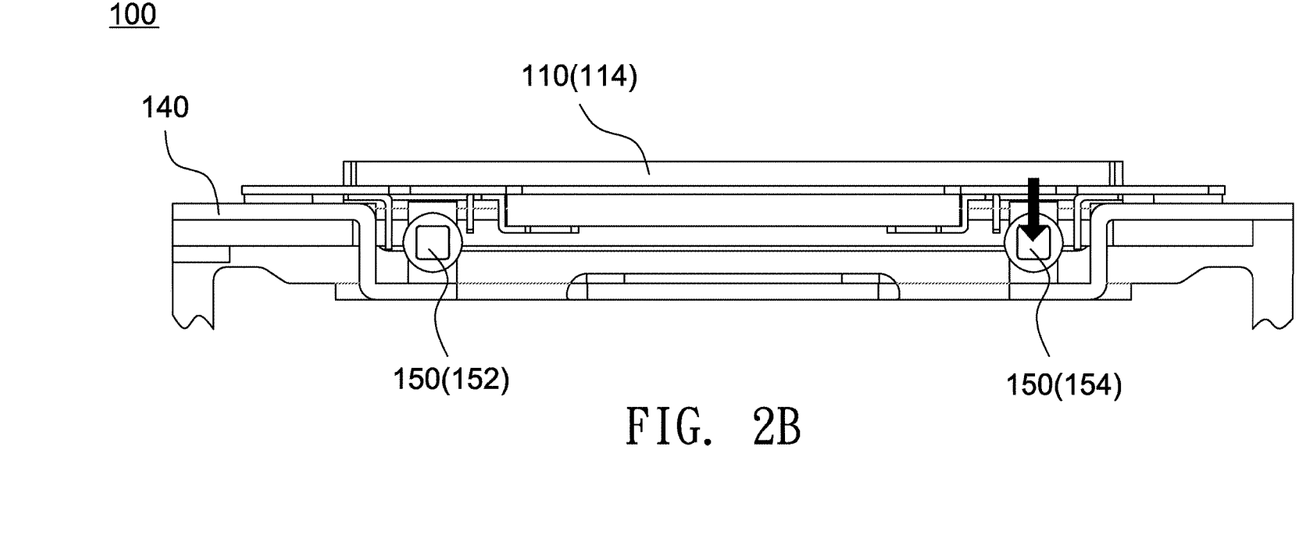

Referring to FIG. 1 again, multiple actuators 150 may be disposed under the carrier 110. In this embodiment, multiple actuators 150 may include electromagnets 152, 154, 156 and 158 disposed overlapping four sides of the carrier 110, the electromagnets 152 and 154 may be disposed under two opposite sides of the inner frame 114, and the electromagnets 156 and 158 may be disposed under two opposite sides of the outer frame 112. In this embodiment, each actuator 150 includes an electromagnet. In other embodiment, at least one of the electromagnets 152, 154, 156 and 158 may be replaced with a coil such as an air core coil. As shown in FIG. 2A, when the electromagnet 152 is energized, an attractive force is generated to attract the inner frame 114, which causes one end of the inner frame 114 (such as the left end) to move downwardly. Then, as shown in FIG. 2B, when the electromagnet 154 is energized, an attractive force is generated to attract the inner frame 114, which causes another end of the inner frame 114 (such as the right end) to move downwardly. Therefore, the electromagnet 152 and the electromagnet 154 are alternately energized to cause the inner frame 114 together with the optical plate member 120 to tilt substantially about a first axis (e.g., Y-axis direction) defined by the first pair of elastic members 132 shown in FIG. 1. Similarly, as shown in FIG. 1, when the electromagnet 156 is energized, an attractive force is generated to attract the outer frame 112 and thus cause one end of the outer frame 112 to move downwardly; in comparison, when the electromagnet 158 is energized, an attractive force is generated to attract the outer frame 112 and thus cause another end of the outer frame 112 to move downwardly. Therefore, the electromagnet 156 and the electromagnet 158 are alternately energized to cause two ends of the outer frame 112 to alternately move downwardly, which enables the outer frame 112 together with the optical plate member 120 to tilt substantially about a second axis (e.g., X-axis direction) defined by the second pair of elastic members 134 shown in FIG. 1. Therefore, the optical plate member 120 may tilt about two different axes to reach various positions within an angular range to reflect and/or refract incoming light beams, which may cause a change in the traveling direction and propagation path of incoming light beams. According to the above embodiments, the light path adjustment mechanism is allowed to modify or change light paths to provide beneficial effects according to actual demands, and these beneficial effects may include, but are not limited to, enhancing image resolution and improving picture quality (e.g., eliminating dark regions or blurring image edges).

According to the above embodiments, at least part of the actuators (such as the electromagnets) can be disposed overlapping the carrier to reduce occupied space, weight and component number, thereby realizing a slim and compact light path adjustment mechanism that can be advantageously installed in various electronic devices. Further, the raised structure disposed on the carrier may reinforce structural strength of the carrier to reduce deformation degree and axial torque applied thereon. Besides, the natural frequency of the carrier may be controlled by adjusting the arrangement of the raised structure to avoid resonance vibrations.

Figure 3:
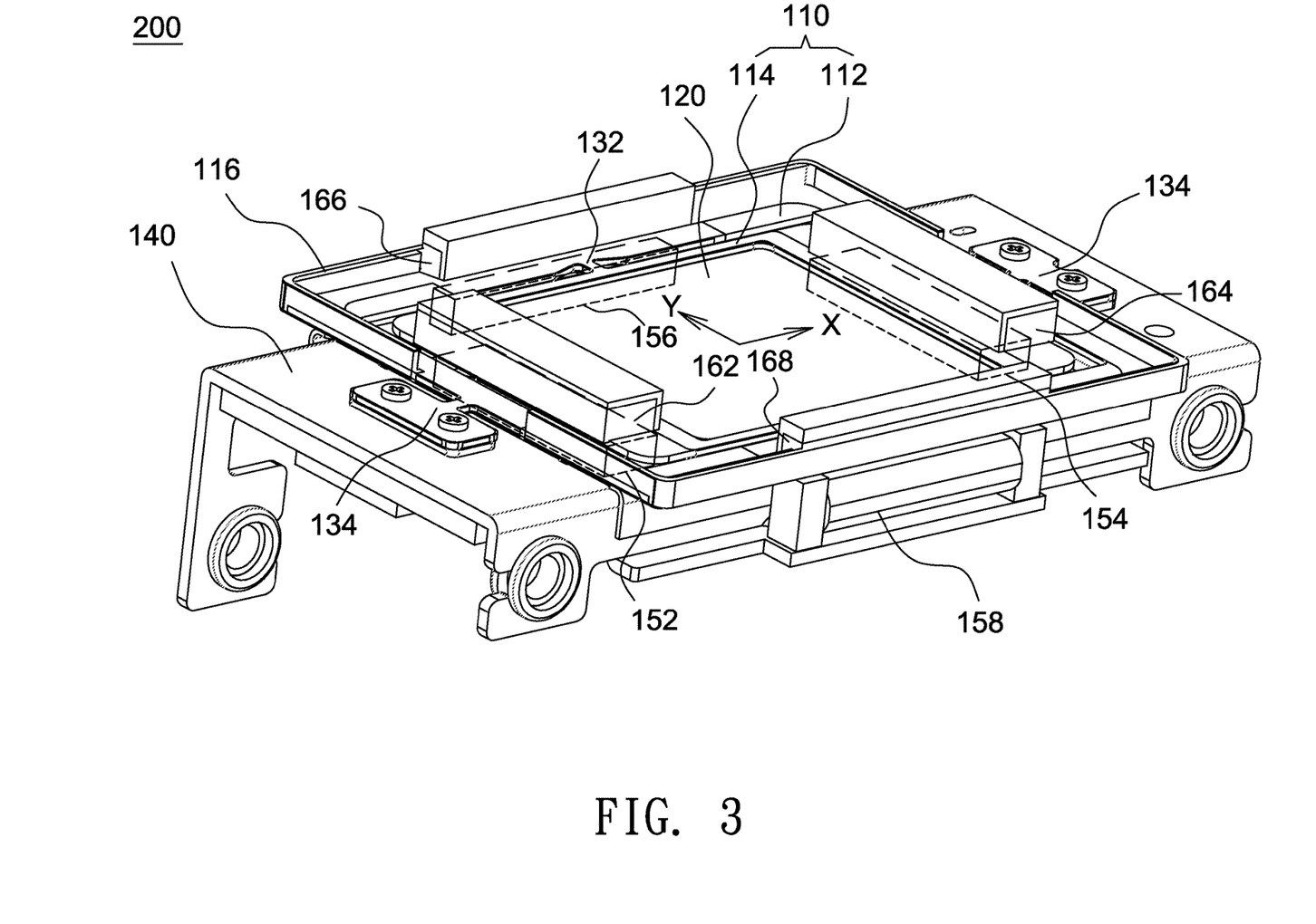
FIG. 3 shows a schematic diagram of a light path adjustment mechanism according to another embodiment of the invention.
Figure 4A:
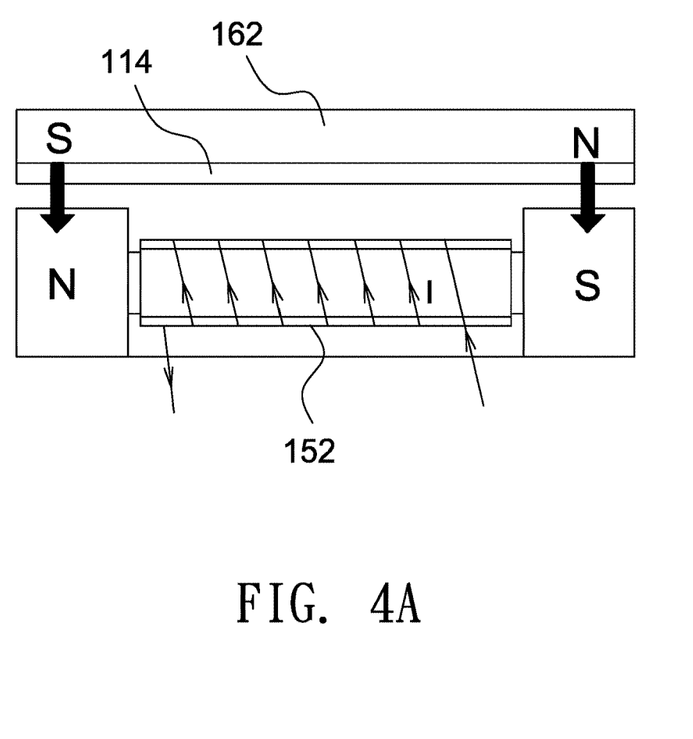
FIGS. 4A, 4B, 5A and 5B show schematic diagrams illustrating magnetic interaction of each actuator according to another embodiment of the invention.
Figure 4B:
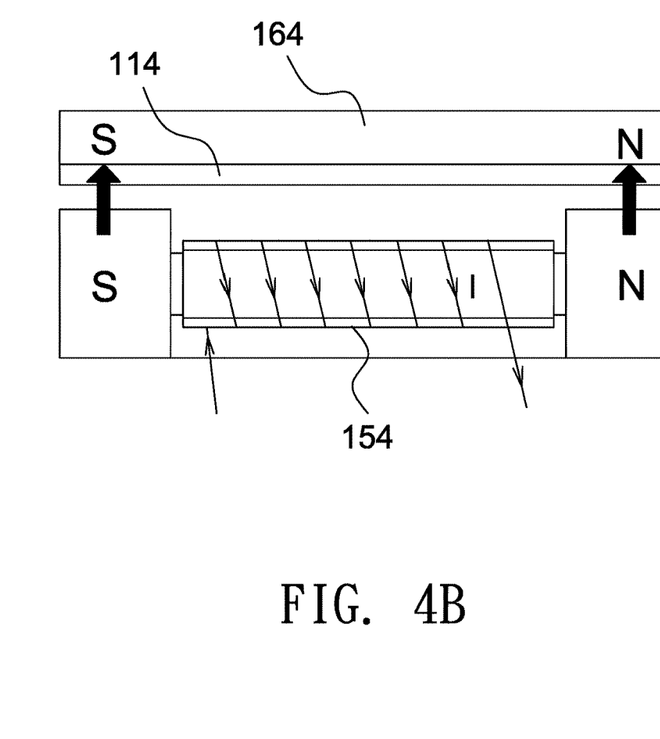
Figures 5A, 5B:
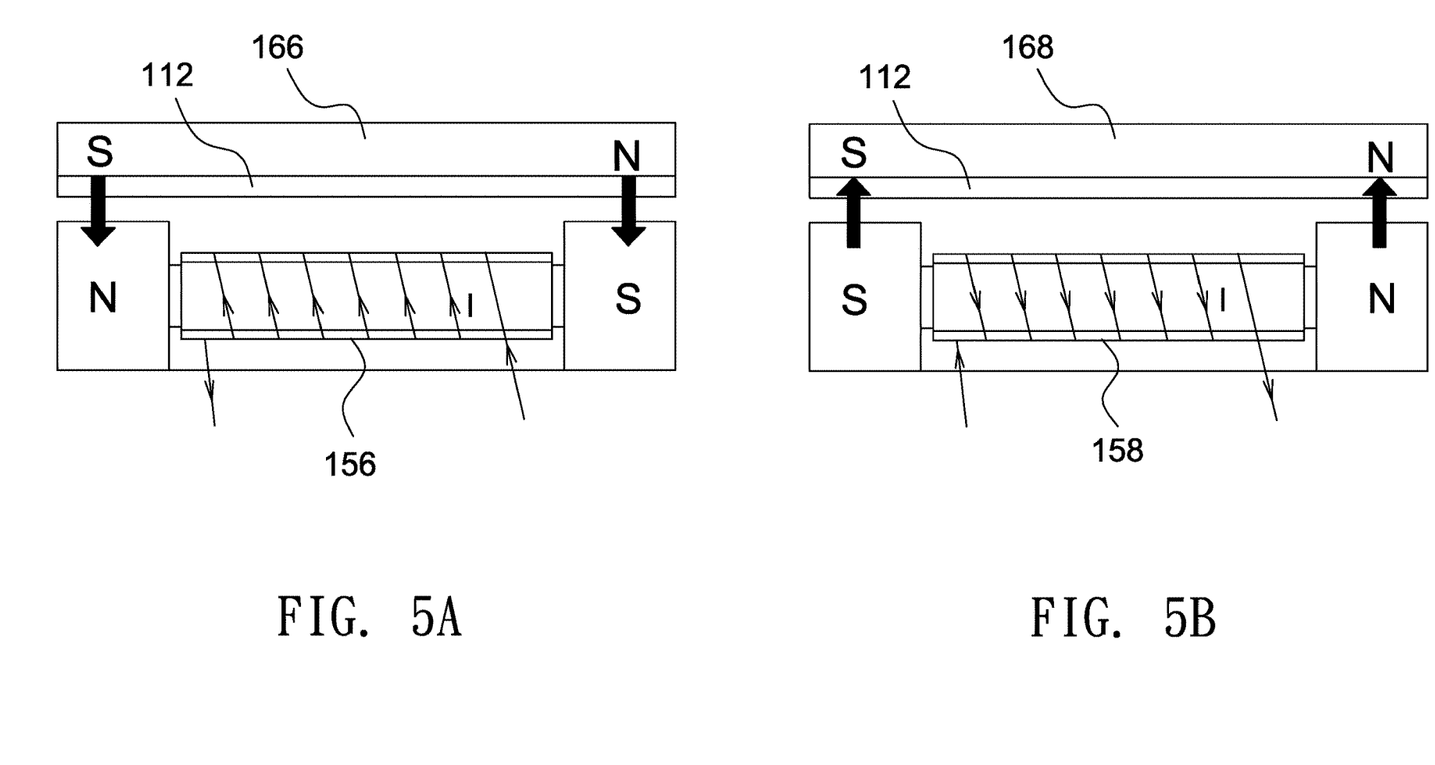
Figure 6:
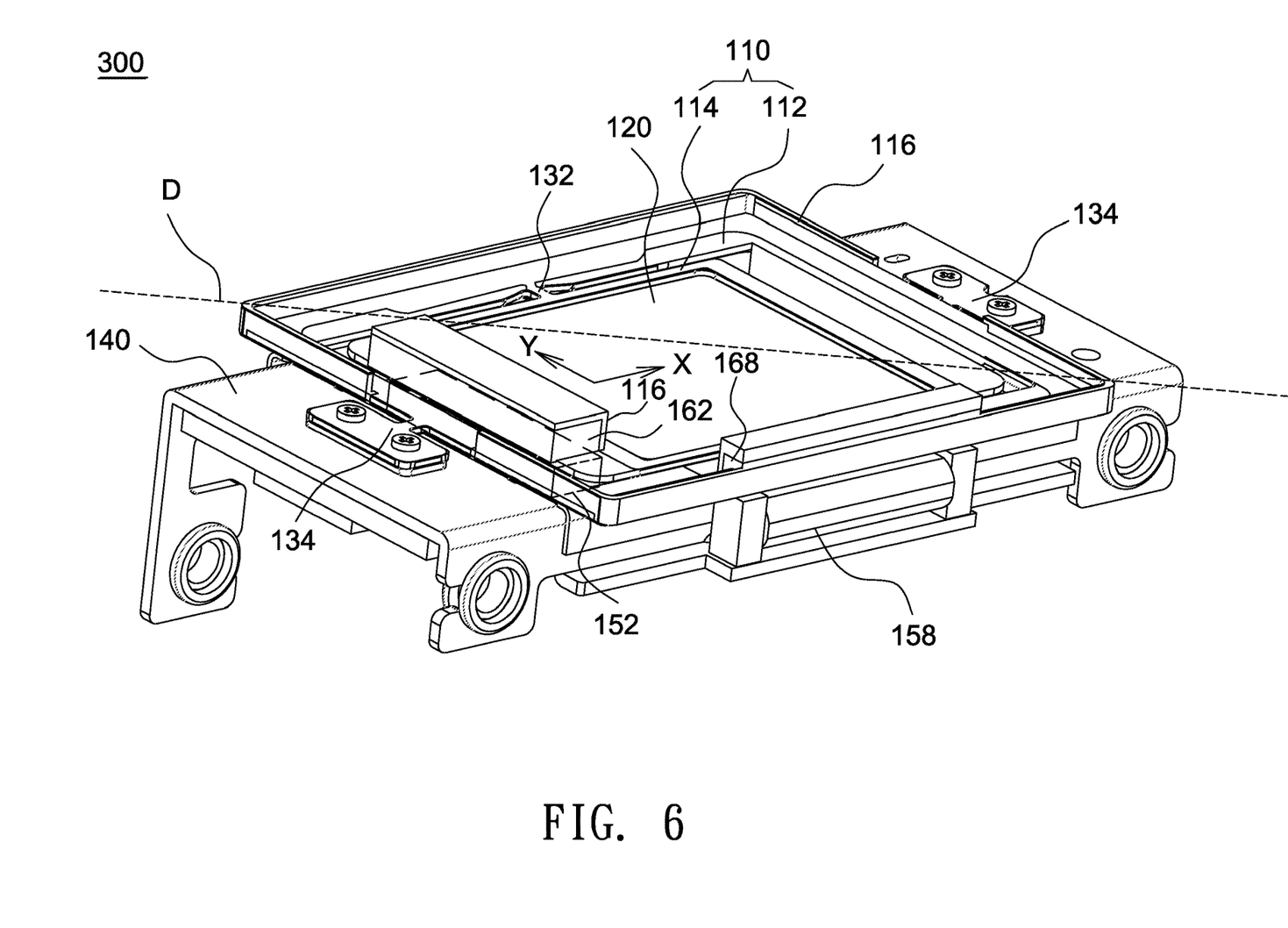
FIG. 6 shows a schematic diagram of a light path adjustment mechanism according to another embodiment of the invention.

FIG. 3 shows a schematic diagram of a light path adjustment mechanism according to another embodiment of the invention. With reference to FIG. 3, multiple actuators of a light path adjustment mechanism 200 may include four permanent magnets 162, 164, 166 and 168 disposed respectively on four sides of the carrier 110 and four electromagnets 152, 154, 156 and 158 disposed respectively under the four permanent magnets 162, 164, 166 and 168. The electromagnets 152 and 154 and the permanent magnets 162 and 164 are disposed overlapping two opposite sides of the inner frame 114, and the electromagnet 156 and 158 and the permanent magnets 166 and 168 are disposed overlapping two opposite sides of the outer frame 112. Further, in this embodiment, the outer frame 112, the inner frame 114, the first pair of elastic members 132 and the second pair of elastic members 134 are all made from a non-magnetic material or different non-magnetic materials. In this embodiment, each actuator may include an electromagnet and a corresponding permanent magnet. However, the actuator is not limited to such arrangement and may vary according to actual demands. Herein, the term "permanent magnet" refers to an object made from any material that is magnetized and can create its own persistent magnetic field. In one embodiment, as shown in FIG. 4A, the permanent magnet 162 is disposed on the inner frame 114 and has a south pole (on the left side) and a north pole N (on the right side), and the electromagnet 152 has a north pole N (on the left side) and a south pole (on the right side) to attract the permanent magnet 162 and cause one end of the inner frame 114 to move downwardly. In comparison, as shown in FIG. 4B, the permanent magnet 164 is disposed on the inner frame 114 and has a south pole (on the left side) and a north pole N (on the right side), and the electromagnet 154 has a south pole (on the left side) and a north pole N (on the right side) to repel the permanent magnet 164 and cause another end of the inner frame 114 to move upwardly. Then, each of the electromagnet 152 and the electromagnet 154 reverses the flow direction of a current I and exchanges magnetic polarities to cause the inner frame 114 to tilt in an opposite direction. Therefore, the alternating attraction and repulsion causes the inner frame 114 together with the optical plate member 120 to tilt substantially about a first axis (e.g., Y-axis direction) defined by the first pair of elastic members 132. Further, as shown in FIG. 5A, the permanent magnet 166 is disposed on the outer frame 112 and has a south pole (on the left side) and a north pole N (on the right side), and the electromagnet 156 has a north pole N (on the left side) and a south pole (on the right side) to attract the permanent magnet 166 and cause one end of the outer frame 112 to move downwardly. In comparison, as shown in FIG. 5B, the permanent magnet 168 is disposed on the outer frame 112 and has a south pole (on the left side) and a north pole N (on the right side), and the electromagnet 158 has a south pole (on the left side) and a north pole N (on the right side) to repel the permanent magnet 168 and cause another end of the outer frame 112 to move upwardly. Then, each of the electromagnet 156 and the electromagnet 158 reverses the flow direction of a current I and exchanges magnetic polarities to cause the outer frame 112 to tilt in an opposite direction. Therefore, the alternating attraction and repulsion causes the outer frame 112 together with the optical plate member 120 to tilt substantially about a second axis (e.g., X-axis direction) deboned by the second pair of elastic members 134. As a result, the optical plate member 120 may tilt about two different axes to reach various positions within an angular range to reflect and/or refract incoming light beams, which may cause a change in the traveling direction and propagation path of incoming light beams. In this embodiment, an actuator that generates both attractive and repulsive forces for tilting the optical plate member 120 may achieve a greater degree of vibration. Therefore, even the actuator is disposed on only one side of the first axis (the first pair of elastic members 132) and only one side of the second axis (the second pair of elastic members 134), a sufficient angular range of rotation can be still provided. For example, in other embodiment as shown in FIG. 6, the electromagnets 154 and 156 and the permanent magnets 164 and 166 can be omitted. The light path adjustment mechanism 300 may use only the electromagnet 152 to alternately attract and repel the permanent magnet 162 to enable the inner frame 114 together with the optical plate member 120 to tilt about the first axis, and use only the electromagnet 158 to alternately attract and repel the permanent magnet 168 to enable the outer frame 112 together with the optical plate member 120 to tilt about the second axis. This may similarly allow the optical plate member 120 to tilt about two different axes to reach various positions. The arrangement of removing the electromagnets 154 and 156 and the permanent magnets 164 and 166 may further reduce occupied space, weight and fabrication costs. In other embodiment, the electromagnet 154 and the corresponding permanent magnet 164 may be replaced by a first spring, and/or the electromagnet 156 and the corresponding permanent magnet 166 may be replaced by a second spring. Moreover, in other embodiment, a diagonal line D may divide the light path adjustment mechanism 300 into an upper and a lower part as shown in FIG. 6, and the upper part without the electromagnet 154 and 156 and the permanent magnets 164 and 166 may be entirely removed to further reduce occupied space, weight and fabrication costs.

In one embodiment, at least one of the permanent magnets 162, 164, 166 and 168 may be replaced with an air core coil that may cooperate with an electromagnet to similarly generate alternating attractive and repulsive forces. Further, as shown in FIG. 6, the raised structure 116 may be used to receive a part of the actuator 150. For example, the raised structure 116 may be used to accommodate a permanent magnet, an electromagnet, or an air core coil.

Figure 7:
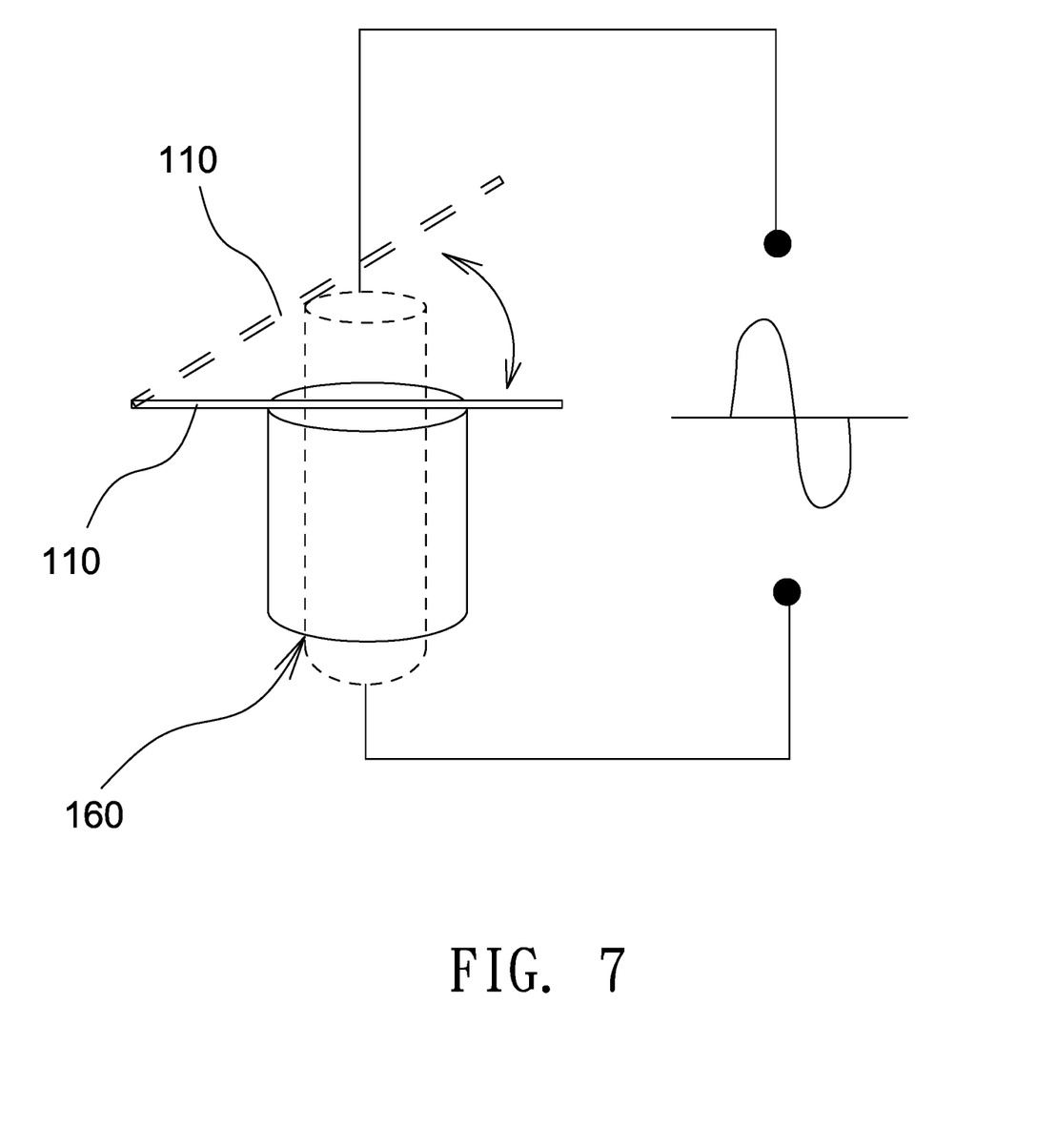
FIG. 7 shows a schematic diagram of a actuator according to another embodiment of the invention.

In other embodiment, as shown in FIG. 7, the driver assembly may include a piezoelectric element 160 disposed on the carrier 110. The piezoelectric element 160 may deform and change in shape when an electric field is applied, converting electrical energy into mechanical energy, to cause reciprocate movement of the carrier 110.

Figure 8:
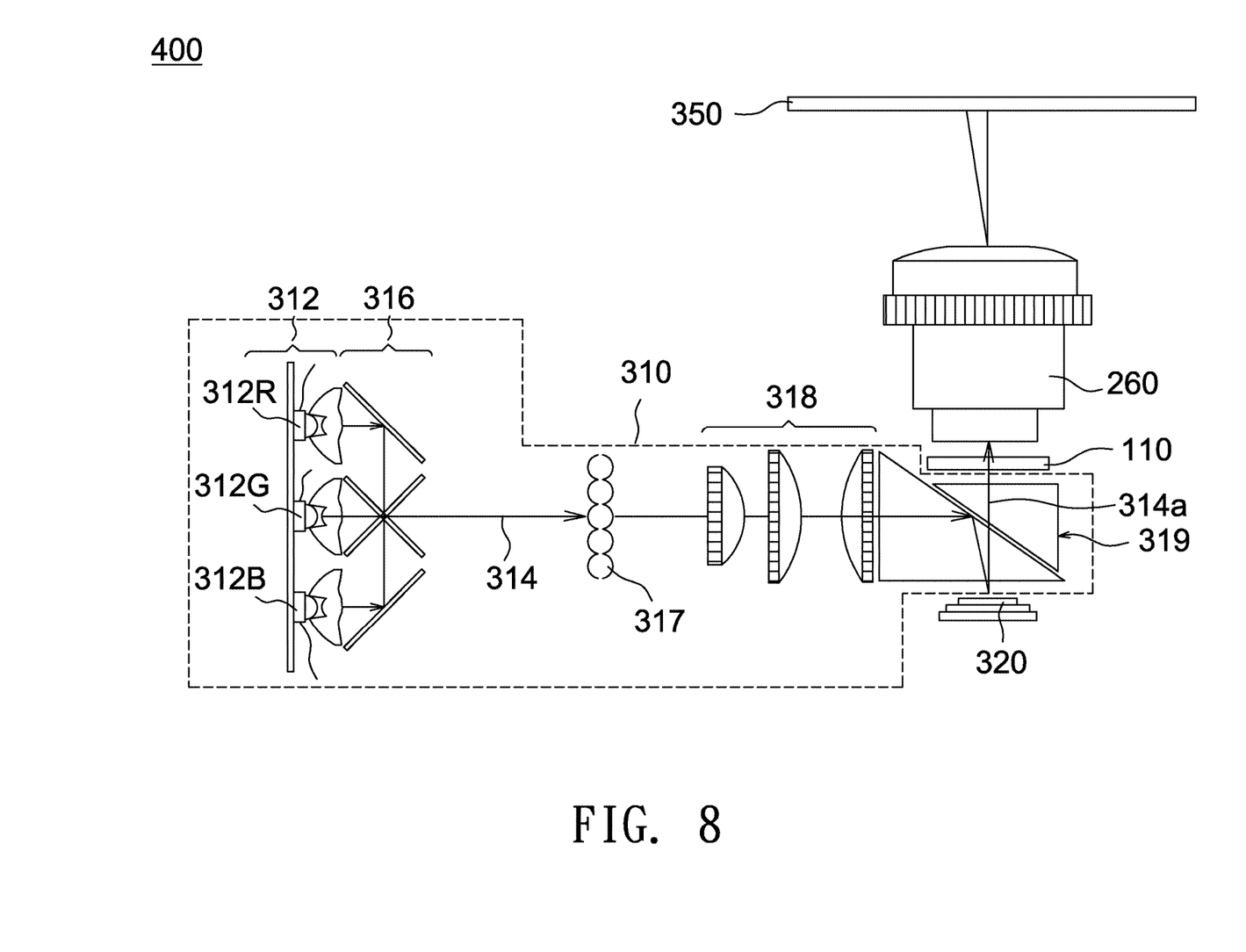
FIG. 8 shows a schematic diagram of a light path adjustment mechanism used in a projector according to an embodiment of the invention.
Figure 9A:
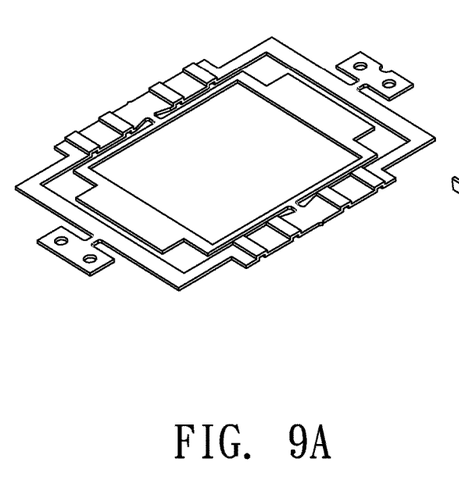
FIGS. 9A-9J show schematic diagrams illustrating various structures of a carrier according to different embodiments of the invention.
Figure 9B:
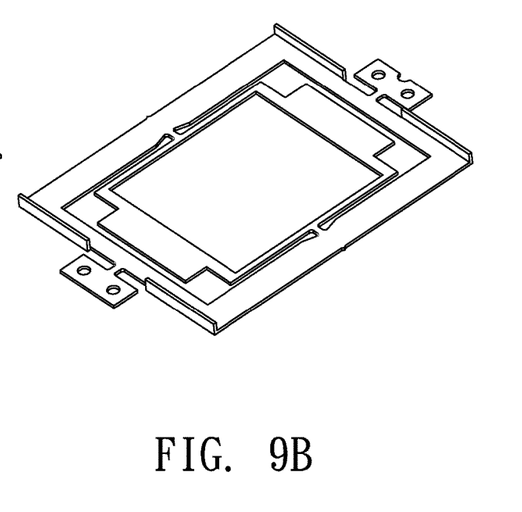
Figure 9C:
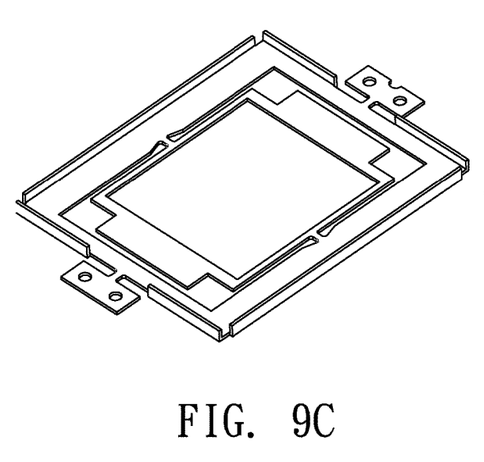
Figure 9D:
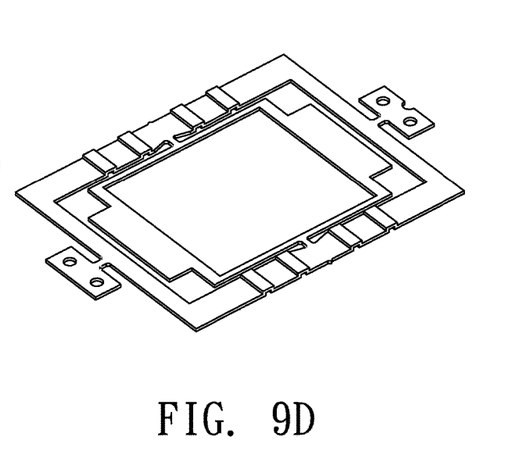
Figure 9E:
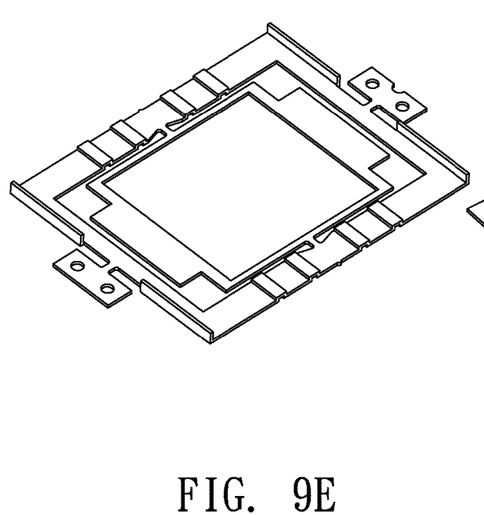
Figure 9F:
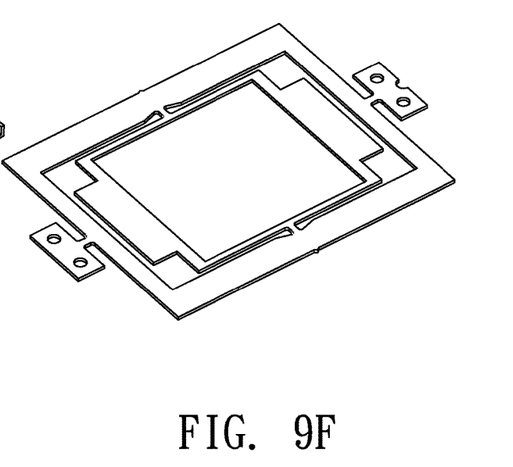
Figure 9G:
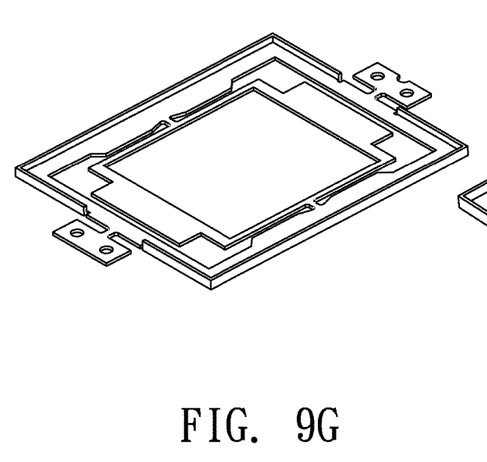
Figure 9H:
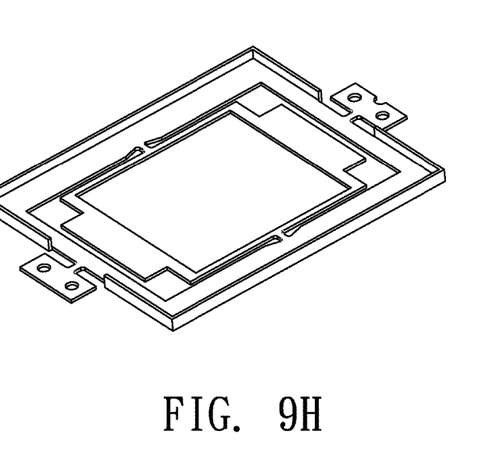
Figure 9I:
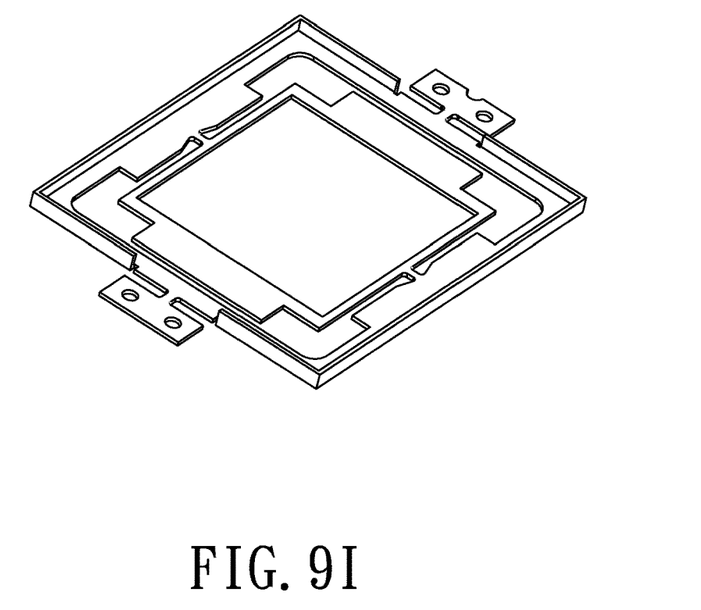
Figure 9J:
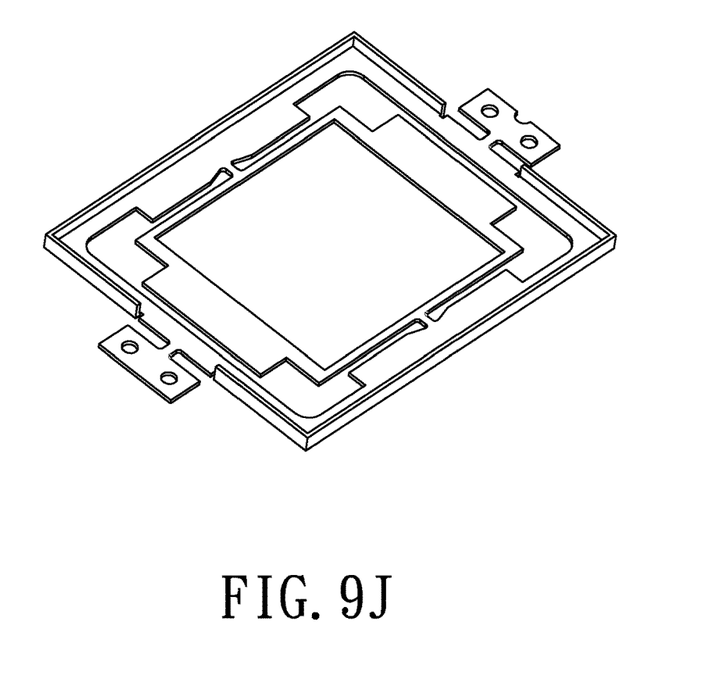

FIG. 8 shows a schematic diagram of a light path adjustment mechanism used in a projector according to an embodiment of the invention. Referring to FIG. 8, an optical device 400 includes an illumination system 310, a light valve 320, a projection lens 330 and a light path adjustment mechanism 100. The illumination system 310 has a light source 312 for providing a light beam 314, and the light valve 320 is disposed in a propagation path of the light beam 314 and converts the light beam 314 into multiple sub images 314a. Besides, the projection lens 330 is disposed in a propagation path of the sub images 314a, and the light valve 320 is disposed between the illumination system 310 and the projection lens 330. Further, the light path adjustment mechanism 100 is disposed between the light valve 320 and the projection lens 330. For example, the light path adjustment mechanism 100 may be disposed in a propagation path of the sub images 314a and between the light valve 320 and a TIR prism 319 or between the TIR prism 319 and the projection lens 330. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a light integration rod 317, a lens assembly 318 and the TIR Prism 319 in succession. Then, the light beam 314 is reflected be the TIR Prism 319, directed to the light valve 320, and converted into multiple sub images 314a by the light valve 320. The sub images 314a passes the TIR Prism 319 and the light path adjustment mechanism 100 in succession and are projected on a screen 350 by the projection lens 330. In this embodiment, when the sub images 314a reach the light path adjustment mechanism 100, the light path adjustment mechanism 100 may alter the propagation path of the sub images 314a. Therefore, at a first time point the sub images 314a are projected on a first position (not shown) of the screen 350 by the light path adjustment mechanism 100, at a second time point the sub images 314a are projected on a second position (not shown) of the screen 350 by the light path adjustment mechanism 100, and the second position is away from the first position for a distance in a horizontal (X-axis) direction and/or a vertical (Y-axis) direction. In this embodiment, the light path adjustment mechanism 100 is allowed to horizontally and/or vertically shift the position of the sub images 314a for a distance to therefore improve horizontally and/or vertically image resolutions. Although the light path adjustment mechanism is described herein as being applied to the optical device 400, in other embodiments, the light path adjustment mechanism can be applied to different optical systems to achieve different effects without limitation. Besides, the arrangement and position of the light path adjustment mechanism in an optical system is not restricted.

According to the above embodiments, the connection bar or elastic member, which may be made from plastic or metal, is deformed when a load is applied thereon and returns to its original shape and size when the load is removed. Further, the support is simply used for defining an accommodation space and may have any shape or design without limitation. For example, the support may be in the form of a base, outer casing, etc.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect and photorefractive effect. Therefore, the multiple individually addressed optical units may modify incoming light beams and output image beams. The optical units may be, for example, micro mirrors or liquid crystal cells, and the light valve may be a digital micro-mirror device (DMD, a liquid-crystal-on-silicon panel (LCOS panel) or a transmissive type LCD panel.

A projector is an apparatus capable of casting an image on a screen through optical projection. In a projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive-type projector. A DLP-type projector using digital micromirror devices as a light valve and an LCOS-type projector using liquid crystal on silicon as a light valve are reflective-type projectors that project images through light reflection. In this embodiment, the projector is a DLP-type projector and the light valve 320 are digital miciomirror devices.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A light path adjustment mechanism, comprising:
   a first pair of elastic members and a second pair of elastic members;
   an outer frame, an inner side of the outer frame being connected with the first pair of elastic members, an outer side of the outer frame being connected with the second pair of elastic members, and the outer frame, the first pair of elastic members and the second pair of elastic members being integrally formed as one piece;
   an inner frame disposed inside the outer frame and connected with the outer frame by the first pair of elastic members;
   an optical plate member disposed on the inner frame and configured to receive multi-pixel plane image light; and
   a raised structure provided on at least two opposite sides of the outer frame, the two opposite sides being connected with the second pair of elastic members, and the raised structure occupying more than half the length of each of the two opposite sides of the outer frame.

2. The light path adjustment mechanism as claimed in claim 1, wherein the raised structure is formed from magnetic substance.

3. The light path adjustment mechanism as claimed in claim 1, wherein the raised structure is integrally formed as one piece with the outer frame and comprises at least one of a bump, a flange, a corner, a step and a wall.

4. The light path adjustment mechanism as claimed in claim 1, wherein the raised structure accommodates a permanent magnet, an electromagnet, or an air core coil.

5. The light path adjustment mechanism as claimed in claim 1, further comprising:
   at least one first actuator for actuating the optical plate member to enable the optical plate member to tilt about a first axis; and
   at least one second actuator for actuating the optical plate member to enable the optical plate member to tilt about a second axis, and the second axis being different to the first axis.

6. The light path adjustment mechanism as claimed in claim 5, wherein the at least one first actuator includes two first actuators respectively disposed overlapping two opposite sides of the inner frame, the at least one second actuator includes two second actuators respectively disposed overlapping two opposite sides of the outer frame.

7. The light path adjustment mechanism as claimed in claim 6, wherein each of the first and the second actuators includes an electromagnet, the electromagnet of each first actuator is disposed under the inner frame, and the electromagnet of each second actuator is disposed under the outer frame.

8. The light path adjustment mechanism as claimed in claim 5, wherein the first actuator disposed overlapping only one side of the inner frame, and the second actuator disposed overlapping only one side of the outer frame.

9. The light path adjustment mechanism as claimed in claim 8, wherein each of the first and the second actuators includes a permanent magnet and an electromagnet, the permanent magnet of the first actuator is disposed on the inner frame, and the permanent magnet of the second actuator is disposed on the outer frame.

10. The light path adjustment mechanism as claimed in claim 5, wherein the first pair of elastic members defines the first axis, the second pair of elastic members defines the second axis, and the second pair of elastic members include a first connection bar and a second connection bar.

11. A light path adjustment mechanism, comprising:
    a support;
    a carrier disposed in the support and connected to the support by a first connection bar and a second connection bar;
    an optical plate member disposed on the carrier and configured to receive multi-pixel plane image light; and
    a raised structure provided on at least two opposite sides of the carrier, the two opposite sides being respectively connected with the first connection bar and the second connection bar, the raised structure being formed from magnetic substance, and the raised structure occupying more than half the length of each of the two opposite sides of the carrier.

12. The light path adjustment mechanism as claimed in claim 11, wherein the raised structure comprises at least one of a bump, a flange, a corner, a step and a wall.

13. The light path adjustment mechanism as claimed in claim 11, wherein the raised structure accommodates a permanent magnet, an electromagnet, or an air core coil.

14. The light path adjustment mechanism as claimed in claim 11, further comprising:
    at least one first actuator for actuating the optical plate member to enable the optical plate member to tilt about a first axis; and
    at least one second actuator for actuating the optical plate member to enable the optical plate member to tilt about a second axis, and the second axis being different to the first axis.

15. The light path adjustment mechanism as claimed in claim 14, wherein the at least one first actuator includes two first actuators respectively disposed overlapping a first side and a second side opposite the first side of the carrier, the at least one second actuator includes two second actuators respectively disposed overlapping a third side and a fourth side opposite the third side of the carrier.

16. The light path adjustment mechanism as claimed in claim 15, wherein each of the first and the second actuators includes an electromagnet that is disposed under the carrier.

17. The light path adjustment mechanism as claimed in claim 14, wherein the first actuator and the second actuator disposed overlapping only two adjacent sides of the carrier, and each of the first and the second actuators includes a permanent magnet and an electromagnet.

18. The light path adjustment mechanism as claimed in claim 17, wherein the permanent magnet of each of the first and the second actuators is disposed on the carrier.

19. The light path adjustment mechanism as claim in claim 11, wherein the raised structure is integrally formed as one piece with the carrier.

* * * * *